(12) United States Patent
Esser

(10) Patent No.: US 9,458,934 B2
(45) Date of Patent: Oct. 4, 2016

(54) COMPRESSION PISTON RING

(75) Inventor: Peter-Klaus Esser, Kuerten (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 0 days.

(21) Appl. No.: 13/201,172

(22) PCT Filed: Dec. 4, 2009

(86) PCT No.: PCT/DE2009/001716
§ 371 (c)(1),
(2), (4) Date: Aug. 11, 2011

(87) PCT Pub. No.: WO2010/094247
PCT Pub. Date: Aug. 26, 2010

(65) Prior Publication Data
US 2011/0309586 A1   Dec. 22, 2011

(30) Foreign Application Priority Data
Feb. 19, 2009   (DE) .................. 10 2009 009 744

(51) Int. Cl.
*F16J 9/00* (2006.01)
*F16J 9/26* (2006.01)
*F16J 9/20* (2006.01)

(52) U.S. Cl.
CPC .... *F16J 9/26* (2013.01); *F16J 9/20* (2013.01)

(58) Field of Classification Search
USPC ................................. 277/440–444
See application file for complete search history.

(56) References Cited

U.S. PATENT DOCUMENTS

| | | | |
|---|---|---|---|
| 1,467,408 A | | 9/1923 | Wilke |
| 1,585,422 A | | 5/1926 | Seifert |
| 1,586,459 A | * | 5/1926 | Norton .......................... 277/460 |
| 281,545 A | | 5/1927 | Madsen |
| 1,815,354 A | | 7/1931 | Grant |
| 2,234,159 A | | 3/1941 | Marien |
| 2,519,683 A | | 8/1950 | Marien |
| 2,912,292 A | * | 11/1959 | Lawitschka .................. 277/444 |
| 3,435,502 A | * | 4/1969 | Morgan et al. .......... 29/888.074 |
| 3,467,397 A | * | 9/1969 | Sugahara ....................... 277/444 |
| 3,677,558 A | * | 7/1972 | Sugahara ....................... 277/444 |
| 3,938,814 A | * | 2/1976 | Cromwell ..................... 277/444 |
| 4,085,490 A | * | 4/1978 | McCormick ............ B23P 15/06 148/589 |

(Continued)

FOREIGN PATENT DOCUMENTS

DE   10011917   9/2001
DE   102004021361   5/2005

(Continued)

OTHER PUBLICATIONS

"Piston Ring Manual" (Kolbenringhandbuch) of the Federal-Mogul Burscheid GmbH, Apr. 2003.

(Continued)

*Primary Examiner* — Kristina Fulton
*Assistant Examiner* — Eugene G Byrd
(74) *Attorney, Agent, or Firm* — Norris McLaughlin & Marcus, P.A.

(57) ABSTRACT

A compression piston ring for an internal combustion engine, comprising a sliding surface formed by two ridges, upper and lower flank surfaces, and an inner circumferential surface, wherein the lower ridge runs at least in some regions parallel to the counter sliding surface and the upper ridge is designed as a taper faced Napier element.

4 Claims, 1 Drawing Sheet

(56) References Cited

U.S. PATENT DOCUMENTS

| | | | | |
|---|---|---|---|---|
| 4,185,843 | A * | 1/1980 | Beyer et al. | 277/441 |
| 4,326,724 | A * | 4/1982 | Gernandt | 277/453 |
| 4,359,230 | A * | 11/1982 | Bruni | 277/444 |
| 4,858,516 | A * | 8/1989 | Klein | 92/240 |
| 5,598,763 | A * | 2/1997 | Rao et al. | 92/212 |
| 6,206,379 | B1 * | 3/2001 | Toshiaki | 277/436 |
| 6,485,026 | B1 * | 11/2002 | Hubert et al. | 277/434 |
| 6,565,093 | B2 * | 5/2003 | Crow et al. | 277/337 |
| 7,429,048 | B1 | 9/2008 | Carson | |
| 7,871,078 | B2 * | 1/2011 | Fischer et al. | 277/442 |
| 2002/0190476 | A1 * | 12/2002 | Preyer | 277/444 |
| 2006/0102131 | A1 | 5/2006 | Han | |

FOREIGN PATENT DOCUMENTS

| | | |
|---|---|---|
| DE | 10200405345 | 5/2006 |
| EP | 0937922 | 8/1999 |
| GB | 281545 | 12/1927 |
| JP | 11-230344 | 8/1999 |
| JP | 2002-039384 | 2/2002 |
| JP | 2002-61746 | 2/2002 |
| KR | 10-2002-0091085 | 12/2002 |

OTHER PUBLICATIONS

Oelabstrelfringe van Basshuysen et al. published on Internet by REIMEDIA, 2008-2010.

Nasenring und Nasenminutenringe van Basshuysen et al. published on Internet by REIMEDIA, 2008-2010.

Kolbenringtypen by Federal Mogul Corporation, 2008.

"Kolbenring fuer Kraftfahrzeuge", p. 33-35, 68, 71, 75-76, 149-151, Redaktionsausschuss fuer "Kolbenring fuer Kraftfahrzeuge", Sankaido Publishing Co., Ltd. JP (Jun. 10, 1997).

* cited by examiner

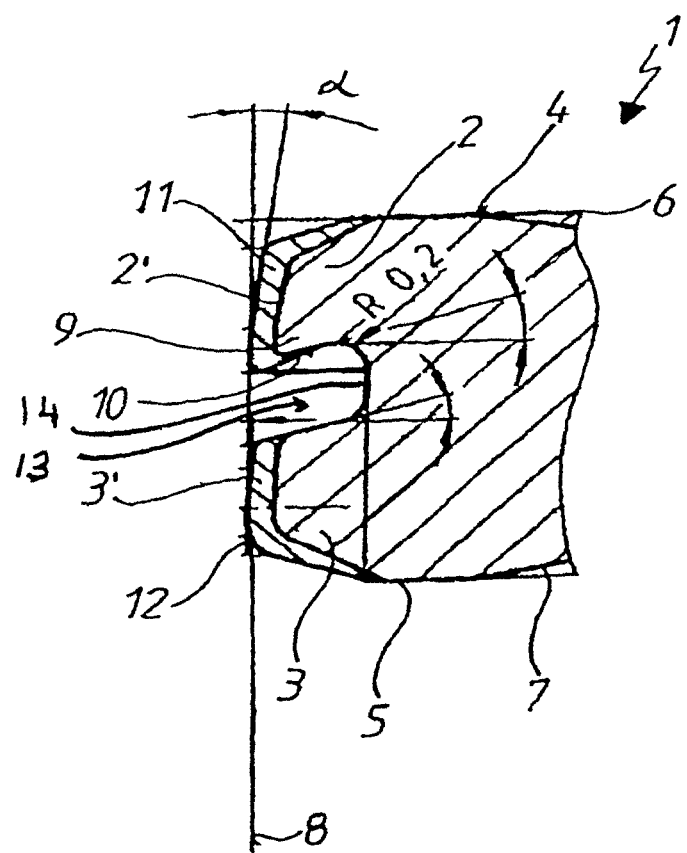

COMPRESSION PISTON RING

BACKGROUND OF THE INVENTION

The invention relates to a compression piston ring for an internal combustion engine.

DE 103 22 032 B3 discloses a compression piston ring for pistons in internal combustion engines or compressors with a sliding surface of an inner circumferential surface that has a groove, upper and lower flanks running therebetween, and an abutment formed by a slot. The groove is interrupted in the area of the abutment. The groove is provided with an undercut running towards the upper flank. The sliding surface is provided with a curved contour, wherein a heat-resistant coil spring is arranged in the area of the inner circumferential surface.

Known from DE 100 11 917 A1 is a piston ring for internal combustion engines having a wear-resistant coating that is applied using the PVD or CVD method and that is provided at least in the area of the sliding surface.

Compression rings today have the property of building up compression using their sliding surface geometry and when possible also of attaining a good scraping effect. It is not always possible to meet both requirements with one ring.

SUMMARY OF THE INVENTION

The underlying object of the invention is to provide a compression piston ring that satisfies the cited requirements, specifically building up compression and attaining a good scraping effect, using a new sliding surface configuration.

This object is attained using a compression piston ring for an internal combustion engine that includes a sliding surface formed by two ridges, upper and lower flank surfaces, and an inner circumferential surface, wherein the lower ridge runs parallel, at least in part, to an opposing sliding surface and the upper ridge is embodied as a taper-faced Napier element.

Advantageous refinements of the inventive subject-matter may be found in the subordinate claims.

The lower ridge is preferably embodied convex and may be symmetrically convex, relative to the ridge height.

In order to enhance the scraping effect, it is advantageous to provide the upper ridge with an inner chamfer.

According to another aspect of the invention, at least the two ridges of the compression piston ring are provided with a PVD layer, at least on the sliding surfaces thereof.

The inventive sliding surface configuration may be particularly advantageously employed in one or two-sided wedge type piston rings.

The inventive subject-matter is depicted in the drawing using an exemplary embodiment and is described as follows.

BRIEF DESCRIPTION OF THE DRAWING

The drawing is a cross sectional view of a compression piston ring of the invention.

The only FIG. depicts part of the inventive compression piston ring 1. The compression piston ring 1 has two ridges 2, 3 that form the sliding surface. Furthermore, there is an upper flank surface 4 and a lower flank surface 5. In this example, the compression piston ring 1 is to be embodied as a wedge type piston ring provided with trapezoidal surfaces 6, 7. The ridge 3 is embodied slightly convex, while the ridge 2 is embodied with a taper-faced Napier element. The outer circumferential surface 3' of the ridge 3 runs at least in part approximately parallel to an opposing sliding surface 8, while a taper-faced groove 2' is worked in at a defined angle a to the opposing sliding surface 8 so that a relatively sharp-edged projection 9 that leads to a good scraping effect is formed. The ridge 3 builds up the compression. For further enhancing the scraping effect, an inner chamfer 10 is provided in the area of the projection 9. In this example, both ridges 2, 3 are provided with a sliding surface coating 11, 12 that was applied using the so-called PVD method. The ring 1 includes a groove 13 located between the ridges 2,3. The groove 13 has a base surface 14 farthest from the opposing sliding surface 8.

Alternative sliding surface coatings for enhancing the wear-resistance of the sliding surfaces are also possible.

The invention claimed is:

1. A compression piston ring for an internal combustion engine, the compression piston ring adapted for providing both a first action for building up compression in a cylinder and a second action of providing oil control by oil scraping along walls of said cylinder, the compression piston ring comprising:
   a lower ridge and an upper ridge, each of the ridges including a sliding surface in contact with an opposing surface along a wall of a cylinder of said engine;
   wherein said lower ridge is configured to build up compression in said cylinder of said internal combustion engine during movement of a piston by at least part of the sliding surface of the lower ridge being parallel to the opposing surface;
   wherein said upper ridge is configured to provide a scraping effect along said wall of the cylinder by having the sliding surface of the upper ridge at a defined angle to the opposing surface and having a lower extremity of the sliding surface of the upper ridge comprise a chamfer having a sharp-edged projection forming a taper-faced Napier element;
   wherein at least the sliding surfaces are provided with a coating comprising a PVD layer;
   wherein the lower ridge is convex relative to height of the lower ridge so as to have an increasing height along a direction parallel to the opposing surface from the opposing surface all the way to a base surface of a groove between the upper ridge and the lower ridge; and
   wherein the lower ridge is symmetrical in a radial direction from a most distal edge of the sliding surface to a base of the lower ridge.

2. The compression piston ring in accordance with claim 1, wherein the piston ring is a one-sided or two-sided wedge ring.

3. The compression piston ring in accordance with claim 1,
   wherein said coating provided at the lower ridge is provided on said sliding surface of the lower ridge and extends along a lower surface of the lower ridge to a lower flank surface of the compression piston ring located radially inward from the lower ridge; and
   wherein said coating provided at the upper ridge is provided on said sliding surface of the upper ridge and extends along an upper surface of the upper ridge to an upper flank surface of the compression piston ring located radially inward from the upper ridge.

4. The compression piston ring in accordance with claim 1,
   in which at the sliding surface side toward the walls of the cylinder, the compression piston ring consists of said lower ridge, said upper ridge and a groove therebetween spacing the upper ridge and the lower ridge; and the groove having a profile consisting of a base surface farthest from the walls of the cylinder and groove side walls extending from the base surface to the sliding surface of the lower ridge and the sliding surface of the upper ridge.

* * * * *